(12) United States Patent
Johansen, Jr. et al.

(10) Patent No.: US 6,180,128 B1
(45) Date of Patent: *Jan. 30, 2001

(54) NON-CARCINOGENIC SUBSTITUTE FOR PLAY SAND

(75) Inventors: Charles J. Johansen, Jr., Katy; Ernest D. Hollas, Weimar, both of TX (US)

(73) Assignee: C-Cure Corp., Katy, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/788,380

(22) Filed: Jan. 27, 1997

(51) Int. Cl.⁷ .............. A01N 25/12; A61R 9/14; A63G 33/00; C09C 1/02
(52) U.S. Cl. .......... 424/409; 424/686; 424/687; 472/126; 106/464; 106/465
(58) Field of Search .............. 424/400, 195.1, 424/687, 686, 682, 489, 409; 472/126; 106/464, 465; 514/451

(56) References Cited

U.S. PATENT DOCUMENTS

Re. 32,513 * 10/1987 Seaber ....................... 239/6
5,472,712 * 12/1995 Oshlack ..................... 424/480

FOREIGN PATENT DOCUMENTS

064284A1  3/1995 (EP) .

OTHER PUBLICATIONS

Atsumi et al, Antimicrobial sand AN 1995:459709, CAPLUS abstract, Mar. 1, 1995.*

The Merck index, tenth edition, See 1628 citation for calcium carbonate, pp. 228–229, 1983.*

Mariano et al, Modeling dough, US pat 5171766 (see enclosed citation and abstract, AN 92:103080 USPAT-FULL), Dec. 15, 1992.*

* cited by examiner

*Primary Examiner*—Edward J. Webman
(74) *Attorney, Agent, or Firm*—Hedman, Gibson & Costigan, P.C.

(57) ABSTRACT

A material for use in children's sand boxes, play sets and play areas that is not hazardous to the health of humans and comprises calcium carbonate or calcium magnesium carbonate.

15 Claims, No Drawings

NON-CARCINOGENIC SUBSTITUTE FOR PLAY SAND

FIELD OF THE INVENTION

This invention relates to a non-carcinogenic substance for use in sand boxes, play sets and play areas. More specifically, the invention relates to the elimination of sand which is a known carcinogenic material from children's sand boxes, play sets and play areas and replacing the carcinogenic sand with calcium carbonate, calcium-magnesium carbonate or crushed limestone that is non-carcinogenic.

BACKGROUND OF THE INVENTION

Sand which is also known as play sand, silica, crystalline silica, ground silica and quartz has long been used the sand boxes and play areas of numerous day care centers, schools and homes throughout the world. Sand has also been used as a ground covering in play grounds to provide a protective and cushioning environment around the play apparatus such as swings and sliding boards.

It has recently been discovered that sand presents a health hazard to humans. The primary health risk is from the inhalation of respirable silica dust which can cause silicosis. Silicosis is a pulmonary fibrosis, i.e. causes the development of scar tissue in lungs, which can be progressive and disabling and even cause death.

The International Agency for Research on Cancer (IARC) has categorized sand as a Class 2A carcinogen. A Class 2A carcinogen is one in which there is limited evidence for carcinogenicity in humans and sufficient evidence for carcinogenicity in experimental animals.

An additional health threat associated with the use of sand in sand boxes and play areas occurs from the germs and diseases left behind by animals such as cats, racoons, opossums and other types of rodents which void or otherwise foul the sand when the play area is not in use.

Due to the health risks associated with continually exposing children to sand in sand boxes and other types of play areas, it is an object of the present invention to provide a material that can be used in sand boxes and other types of play areas that is not carcinogenic and that does not create substantial health risks to humans.

It is also a further object of the present invention to provide a material that can be used in sand boxes and other types of play areas that repels animals such as cats and rodents and thereby prevents the animals from depositing germs, bacteria, or other noisome matter in the sand box or play area.

It is an additional object of the present invention to provide a material that can be used in sand boxes and other types of play areas that can be molded or formed by the user of the play area into shapes such as castles.

SUMMARY OF THE INVENTION

These and other objects of the present invention are achieved by replacing the carcinogenic sand currently used in sand boxes and play areas with calcium carbonate, calcium-magnesium-carbonate or crushed limestone. Although the particle size of the calcium carbonate used in the present invention is not critical, it is preferred that the calcium carbonate have a particle size of about 5 to about 200 mesh, preferably about 20 to about 150 mesh and most preferably about a 25–50 mesh.

The calcium carbonate used in the present invention may contain other naturally occurring impurities such as iron oxide or aluminum oxide. These naturally occurring impurities generally occur in amounts less than ten weight percent of the total weight of the calcium carbonate and do not detract from the objectives of the present invention.

The calcium carbonate used in the present invention is commercially available from a number of sources such as Specialty Minerals, Inc. of Easton, Pa. under the tradename MARBLEWHITE, Franklin Limestone Company of Nashville, Tenn. under the "T" line of products, ECC America, Inc. of Sylacagua, Ala. under the tradename MICRO-WHITE, Georgia Marble Company of Kennesaw, Ga. under the "GAMMA" line of products and from J. M. Huber Corp. of Marble Falls, Tex. under the "HUBER-CARB" line of products. The calcium-magnesium carbonate used in the present invention is commercially available from National Mineral Products of Salinas, Calif. under the tradename DOLOMITE.

The present invention may also comprise additional property enhancing additives such as an animal repellant to prevent animals such as cats, racoons, opossums and other rodents from entering the sandbox or play area and depositing germs, bacteria, or other noisome matter in the sandbox or play area. The animal repellents used in the present invention are commonly known in the industry such as those described in U.S. Pat. Nos. 5,554,377, 4,775,532, and 4,735,803 which are incorporated herein by reference. It is important that the animal repellant be a material that will not present a health hazard or be otherwise offensive to humans. The animal repellent may be sprayed or sprinkled onto the calcium carbonate or calcium magnesium carbonate in an amount that is effective to repel animals as described in U.S. Pat. Nos. 5,554,377, 4,775,532 and 4,735,803 which are incorporated herein by reference.

The present invention may further comprise about 0.1 percent to about 20 percent based upon the total weight of the calcium carbonate of a mold or forming means such as a clay, starch or cellulose. The mold or forming means will increase the adhesive and/or cohesive properties of the calcium carbonate to allow the user of the sand substitute to mold the sand substitute into shapes such as castles, blocks or walls. Some of the preferred mold or forming agents are cellulose ethers such as, methyl cellulose, hydroxyethyl cellulose, sodium carboxymethyl hydroxyethyl cellulose, animal glues, starches such as corn, wheat, or potato, alginates, polyvinyl alcohols, proteins, gums such as gum arabic, gum guar, locust bean gum and clays such as montmorillonite, kaolinite, hectorite, bentonite, kieselguhr, attapulgite and smectite and any combination of the foregoing.

The clays such as bentonite or attapulgite clay of the type commercially available from Engelhard Minerals Co., under the tradename ATTAGEL 40, are especially preferred mold or forming means because the addition of a small amount of water to the calcium carbonate and clay composition will produce a composition that can be readily molded into three dimensional shapes when wet or moist and can be easily returned to particulate matter when dry.

In a preferred embodiment, the present invention comprises a sandbox consisting essentially of a frame that encloses a specific area containing a non-carcinogenic sand substitute. The frame can be any shape such as a rectangle, square, circle, triangle or combination of the foregoing. The sand substitute consists essentially of calcium carbonate, and animal repellant and a forming means. Due to the physical properties of the calcium carbonate, such as the solubility, it is important to include to animal repellant and forming means to insure that the integrity or "sand like" properties of the non-carcinogenic sandbox material is maintained.

DETAILED DESCRIPTION OF A PREFERRED EMBODIMENT

The present invention will be described in detail by reference to the following examples which are provided for illustrative purposes. The following examples should not be construed as limiting the invention. Many variations which do not depart from the spirit or scope of the present invention will suggest themselves to those skilled in the art. All such obvious modifications are within the intended scope of the invention.

EXAMPLE 1

A non health hazardous sand box material in accordance with the present invention is prepared by mixing 100 lbs of natural calcium carbonate with an average particle size of about 30 mesh which is commercially available from J. M. Huber Corp. Marble Falls, Tex. 78654 under the tradename HUBERCARB F12-40, with 2 lbs of bentonite clay commercially available from Western Bentonite. The composition is a non-carcinogenic and can be readily molded into a castle.

EXAMPLE 2

A non health hazardous sand box material in accordance with the present invention is prepared by mixing 100 lbs of crude calcium-magnesium carbonate with an average particle size of about 30 mesh which is commercially available from National Mineral Products of Salinas, Calif. under the tradename DOLOMITE with 2 lbs of bentonite clay commercially available from Western Bentonite. The composition is a non-carcinogenic and can be readily molded into a castle.

EXAMPLE 3

A non health hazardous sand box material in accordance with the present invention is prepared by mixing 100 lbs of calcium carbonate as described in Example 1, with the animal repellant as described in U.S. Pat. No. 4,775,532. The composition is a non-carcinogenic sand box material that repels animals.

EXAMPLE 4

A non health hazardous play area material in accordance with the present invention is prepared by mixing 100 lbs of calcium-magnesium carbonate as described in Example 2 with the animal as described in U.S. Pat. No. 4,735,803. The composition is a non-carcinogenic material that repels animals and can be placed under a swing or at the end of a sliding board to protect the child using the swing or sliding board.

EXAMPLE 5

A non health hazardous sand box material in accordance with the present invention is prepared by mixing 100 lbs of calcium carbonate as described in Example 1, 4 lbs of attapulgite clay commercially available from Englehard Minerals Co. under the tradename ATTAGEL 40 and an animal repellant as described in U.S. Pat. No. 4,735,803. The composition is a non-carcinogenic sand box material that repels animals and can be molded into a castle.

EXAMPLE 6

A non health hazardous play area material in accordance with the present invention is prepared by mixing 100 lbs of calcium-magnesium carbonate described in Example 2, 4 lbs of attapulgite clay commercially available from Englehard Minerals Co. under the tradename ATTAGEL 40 and an animal repellant as described in U.S. Pat. No. 4,775,532. The composition is a non-carcinogenic material that repels animals and can be placed under a swing or at the end of a sliding board to protect the child using the swing or sliding board.

A further benefit of the present invention is that the sand box material in accordance with the present invention is less dense than traditional sand. Thus 25 lbs of the material in accordance with the present invention can cover a greater surface are than 25 lbs of sand.

An additional benefit of the present invention is that the sand box material in accordance with the present invention is not as dusty as silica.

All the above mentioned patents, publications and test methods are herein incorporated by reference.

We claim:

1. A sandbox consisting of a frame and a non-carcinogenic substance within the frame
   wherein the substance consists of calcium carbonate or calcium magnesium carbonate with a particle size of about 5 to about 200 mesh and about 0.1 percent to about 20 percent of a forming means.

2. An improved children's play area comprising sand wherein the improvement consists of entirely replacing the sand with a non-carcinogenic substance consisting of calcium carbonate or calcium magnesium carbonate with a particle size of about 5 to about 200 mesh.

3. A method for producing an improved children's play area comprising sand the improvement which consists of entirely replacing the sand with a non-carcinogenic mixture consisting of i) calcium carbonate or calcium magnesium carbonate with a particle size of about 5 to about 200 mesh and; ii) optionally about 0.1 percent to about 20 percent of a forming means.

4. An improved children's play area as defined in claim 3 wherein the forming means is selected from the group consisting of cellulose ethers, animal glues, starches, alginates, polyvinyl alcohols, proteins, gums, clays and any combination of the foregoing.

5. An improved children's play area as defined in claim 4 wherein the forming means is a clay is selected from the group consisting of montmorillonite, kaolinite, hectorite, bentonite, kieselguhr, attapulgite and smectite and any combination of the foregoing.

6. The improved children's play area as defined in claim 3 wherein the forming means is about 2 percent of the mixture.

7. The improved children's play area as defined in claim 3 wherein the forming means is about 4 percent of the mixture.

8. The improved children's play area as described in claim 3 wherein the mixture is sprayed or sprinkled with a effective amount of an animal repellant to repel animals.

9. A sandbox consisting essentially of a frame and a non-carcinogenic substance within the frame wherein the substance within the frame consists of calcium carbonate or calcium magnesium carbonate with a particle size of about 5 to about 200 mesh.

10. The sandbox as defined in claim 1 wherein the particle size of the calcium carbonate or calcium magnesium carbonate is about 20 to about 150 mesh.

11. The sandbox as defined in claim 1 wherein the particle size of the calcium carbonate or calcium magnesium carbonate is about 25 to 50 mesh.

12. The improved children's play area as defined in claim 2 wherein the particle size of the calcium carbonate or calcium magnesium carbonate is about 20 to 150 mesh.

13. The improved children's play area as defined in claim 2 wherein the particle size of the calcium carbonate or calcium magnesium carbonate is about 25 to 50 mesh.

14. The sandbox as defined in claim 9 wherein the particle size of the calcium carbonate or calcium magnesium carbonate is about 20 to 150 mesh.

15. The sandbox as defined in claim 9 wherein the particle size of the calcium carbonate or calcium magnesium carbonate is about 25 to 50 mesh.

* * * * *